(No Model.)

F. W. COY.
ROLL.

No. 247,171.   Patented Sept. 20, 1881.

Witnesses:
Wm Zittel.
J. R. Snow.

Inventor:
Frederick W. Coy.

UNITED STATES PATENT OFFICE.

FREDERICK W. COY, OF BOSTON, MASSACHUSETTS, ASSIGNOR TO GEORGE H. P. FLAGG, TRUSTEE, OF SAME PLACE.

ROLL.

SPECIFICATION forming part of Letters Patent No. 247,171, dated September 20, 1881.

Application filed July 8, 1881. (No model.)

*To all whom it may concern:*

Be it known that I, FREDERICK W. COY, of Boston, in the county of Suffolk and State of Massachusetts, have invented an Improved Roll, of which the following is a full, clear, concise, and exact description, reference being had to the accompanying drawings, in which—

Figure 1:
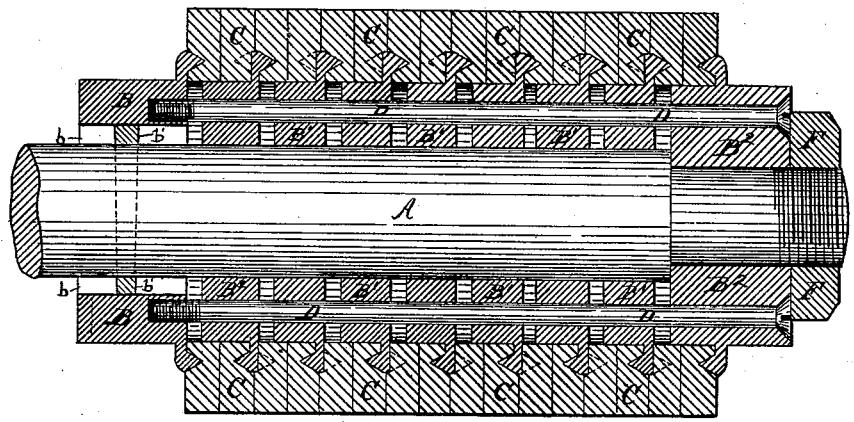
Figure 2:
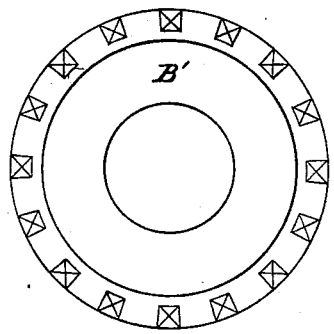

Figure 1 is a lengthwise section of a roll embodying my invention. Fig. 2 is a side elevation, and Fig. 3 an edge view, of one of the metal disks used for holding the disks of felt.

Rolls covered with felt or rubber are required for use in sandpapering-machines of the kind described in my application for a patent for sandpapering-machine filed March 30, 1881, as well as in many other instances; and my invention relates to means for securing the felt or other like material of which the roll is partly composed; and it consists in the combination of a number of felt disks and a number of toothed clamping-disks, whereby the felt disks are securely held and a roll is produced of the requisite elasticity which is compact and durable, and can be run at a very high speed without injuring it.

In the drawings, A is the shaft, B B' B$^2$ the metal clamping-disks, and C disks of felt or the like, depending on the qualities desired in the roll.

Figure 3:
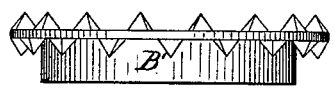

The end disk, B, is placed upon the shaft or any suitable arbor, and then the two left-hand disks C in Fig. 1 are put in place, then one of the disks B', then two other felt disks, C, and so on, the other end disk, B$^2$, being put in last. The disks are then compressed to the desired extent, and are best held together by two or more lengthwise screws, D D; but these details of construction may readily be varied, as will be obvious. The teeth of the metal disks take hold of the felt disks and hold them securely in their places. It is better to alternate the teeth on the disks B', as shown in Fig. 3, and as indicated also in Fig. 1.

The finished roll (shown in Fig. 1) is held upon its shaft by the nut F, and also by grooves $b\ b$ in disk B, which receive the ends of a pin, $b'$, passing through the shaft. This is in order that the disks B B' B$^2$ may be drawn close together by the screws D D, as occasion may require.

It will be clear that this method of constructing a roll by using a series of disks of felt held between a series of metal clamping-disks is applicable not only to felt disks, but to disks of rubber, cloth, leather, or the like.

What I claim as my invention is—

The improved roll above described, composed of the series of felt disks C C and the series of toothed clamping disks B B' B$^2$ and means for clamping the disks, combined together, substantially as described.

FREDERICK W. COY.

Witnesses:
W. A. COPELAND,
J. R. SNOW.